United States Patent [19]

Beraha et al.

[11] Patent Number: 5,754,458
[45] Date of Patent: May 19, 1998

[54] TRAILING BIT ANTICIPATOR

[75] Inventors: Rodolfo Beraha, Los Altos, Calif.;
Robert H. Miller, Jr., Loveland, Colo.

[73] Assignee: Hewlett-Packard Company, Palo Alto, Calif.

[21] Appl. No.: 655,581

[22] Filed: May 30, 1996

[51] Int. Cl.$^6$ .................. G06F 7/38; G06F 7/00
[52] U.S. Cl. .................. 364/748.03; 364/715.04; 364/748.05
[58] Field of Search .......... 364/715.1, 715.04, 364/736.5, 745.01, 745.02, 748.02, 748.03, 748.05, 748.11

[56] References Cited

U.S. PATENT DOCUMENTS

| | | | |
|---|---|---|---|
| 4,431,928 | 2/1984 | Skokan | 307/465 |
| 4,598,385 | 7/1986 | Kessels et al. | 364/900 |
| 4,933,897 | 6/1990 | Shankar et al. | 364/900 |
| 5,157,673 | 10/1992 | Feldbrugge | 371/68.1 |
| 5,555,428 | 9/1996 | Radigan et al. | 395/800 |
| 5,606,564 | 2/1997 | Ho et al. | 371/22.1 |
| 5,630,048 | 5/1997 | LaJoie et al. | 395/183.01 |
| 5,640,508 | 6/1997 | Fujiwara et al. | 395/183.06 |

Primary Examiner—Reba I. Elmore
Assistant Examiner—Robert J. Dolan
Attorney, Agent, or Firm—Jonathan B. Penn

[57] ABSTRACT

A method and apparatus for determining the trailing bit position from a two operand addition is described. The determination of the trailing bit occurs in parallel with the addition. The two operands are encoded together and the encoded word used to determine the trailing bit position. As the operations of encoding the operands and operating upon the encoded operands require no more time than known methods to determine the trailing bit position after the addition is completed, and as the encoding and operating on the encoded words occurs in parallel with the addition operation, the present invention allows faster processing in the floating point unit.

3 Claims, 6 Drawing Sheets

```
A:        0 000011101
B:        0 000000001          CARRY-IN = 0
                         /71
         KKKKPPPKG
STICKY WORD:  000100110
ACTUAL SUM:   0 000111110
```

| ENCODED WORD N+1 | ENCODED WORD N | STICKY WORD |
|---|---|---|
| G | P | 1 |
| G | G | 1 |
| P | K | 1 |
| K | G | 1 |
| K | P | 1 |
| G | K | 0 |
| P | G | 0 |
| P | P | 0 |
| K | K | 0 |

FIG. 7

| ENCODING | Cin | FINAL ENCODING |
|---|---|---|
| K | 0 | 0 |
| P | 0 | 0 |
| G | 0 | 0 |
| K | 1 | 1 |
| P | 1 | 0 |
| G | 1 | 1 |

FIG. 6

| A | B | ENCODING |
|---|---|---|
| 0 | 0 | K |
| 0 | 1 | P |
| 1 | 0 | P |
| 1 | 1 | G |

KKKKPPPKG
STICKY WORD: 000100110
ACTUAL SUM: 0 00011110

CARRY-IN = 0

*FIG. 8*

TRAILING BIT ANTICIPATOR

FIELD OF THE INVENTION

This invention is in the field of digital computing. It specifically relates to floating point arithmetic units ("FPU"s) and their operation.

BACKGROUND OF THE INVENTION

In a traditional FPU, a sum is computed and then the position of the trailing bit is detected by operating on the calculated sum. The trailing bit position is used to round off the calculated sum. This known method requires waiting for the addition of the two operands to be completed before starting the process of detecting the trailing bit.

For example, if operands A and B are added, the result of A+B must be rounded off and normalized. If the final result is defined as a single precision number, a 23 bit number must be stored. If the result is defined as a double precision number, then 52 bits must be stored. In either case, the result of the addition must be rounded off by the appropriate amount. As the interim result is shifted to obtain a final result of the correct length, some of the least significant bits may be discarded, with a consequent loss of precision in the final result. The term "sticky" means those bits which are discarded during a rounding operation. In any rounding operation, the least significant bit of the mantissa is followed by a guard bit, a rounding bit, and then the "sticky". If any bit position within the sticky contains a "1", then the value of the sticky is 1 and some loss of precision has occurred in the rounding process. If none of the bit positions within the sticky contains a "1", then the value of the sticky is zero and no loss of precision occurs with the rounding process.

In all cases where rounding is required, the process uses staged OR gates. Using these staged OR gates either to determine the sticky or to discard bits takes time. In particular, as the shifting and determination of sticky occur after the addition of the operands is complete, the determination of sticky is a time intensive operation.

SUMMARY OF THE INVENTION

The present invention provides a method and apparatus for anticipating the trailing bit of the result bus before the actual result is available from the FPU. The trailing bit anticipator determines the exact position of the least significant bit of the result, while that result is still being calculated in the FPU. The present invention thus converts a serial set of operations into a parallel set, increasing the overall performance of the FPU.

The trailing bit anticipator works by encoding the input operands together. The resulting encoded word is then manipulated to yield a binary sticky word using a second encoding scheme which does not involve carry propagation. The final binary sticky word has a trailing one in exactly the same position as the result from the addition operation will have, when complete. The encoding of the input operands and operating on the encoded operands requires approximately the same amount of time as determining the trailing bit using conventional methods. However, in the present invention, these operations occur in parallel with the addition operation.

The present invention will now be described in detail with reference to the figures listed and described below.

BRIEF DESCRIPTION OF THE DRAWINGS

FIG. 5 is a table showing how the binary operands are encoded by the present invention;

FIG. 6 is a table illustrating the special case of how the encoded least significant bit and the carry-in are translated into a binary sticky word output;

FIG. 7 is a table showing how the encoded characters generate a binary output character; and FIG. 8 is an example showing how the present invention operates.

DETAILED DESCRIPTION OF THE PREFERRED EMBODIMENT

Figure 1:
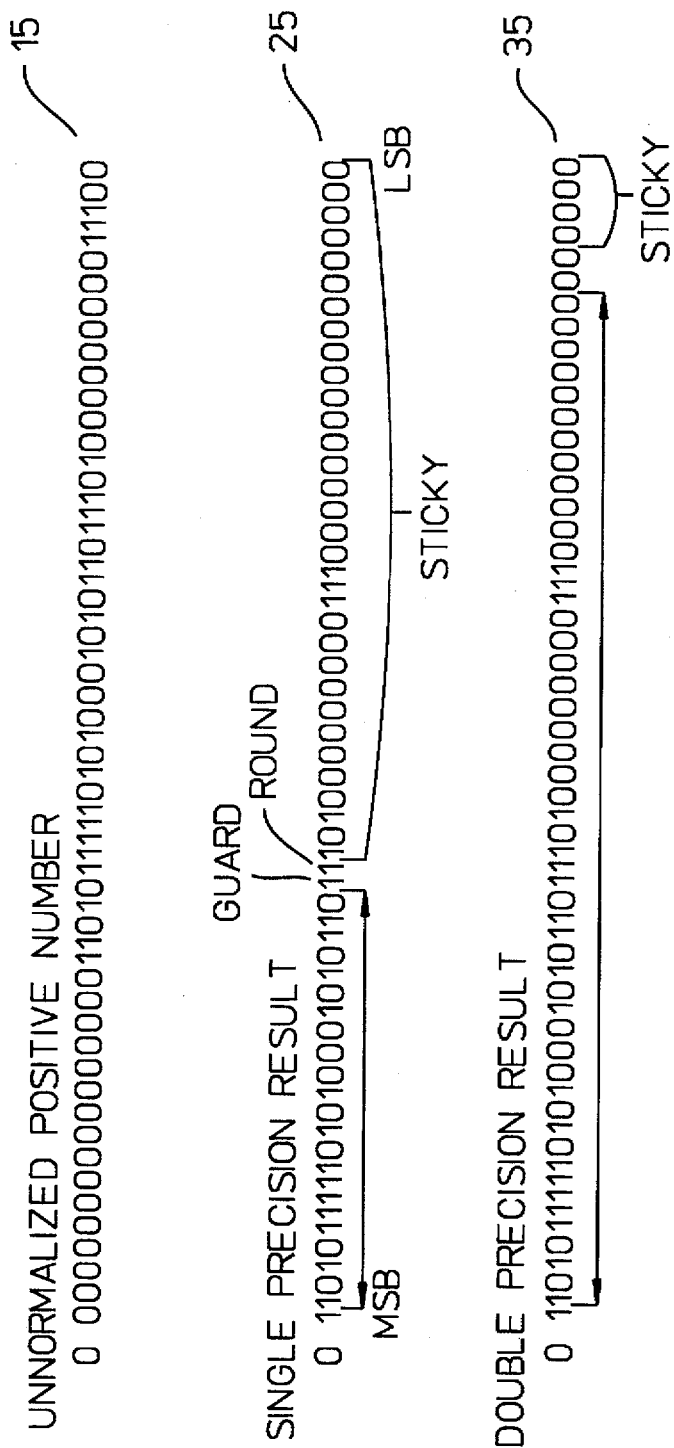
FIG. 1 illustrates normalizing a number.

FIG. 1 provides an example of an un-normalized positive number 15 stored in a known "2s complement" format. This method of storing numbers uses a sign bit to indicate whether the number is positive or negative. A "0" sign bit indicates a positive number and a "1" sign bit indicates a negative number. To form a negative number using 2s complement, the remainder of the bits in the number after the sign bit are inverted and a "1" added to the result of the inversion.

In the environment wherein the present invention operates, numbers are stored as either single or double precision. When stored as a single precision result 25, number 15 has a 23 bit mantissa following the most significant bit ("MSB"), a guard bit, a round bit, and a 33 bit sticky. As the sticky has several bit positions with a value of "1", the sticky itself has a value of 1. When stored as a double precision result 35, number 15 has a 52 bit mantissa following the MSB, a guard bit, a round bit, and a 4 bit sticky. In this case, as the sticky has no bit position with a value of "1", the sticky's value is 0.

The present invention uses the fact that for both positive and negative numbers stored using the 2s complement format, the location of the least significant bit ("LSB") remains exactly the same.

To normalize the result of an addition properly, the MSB must be shifted into the leading bit position, the level of precision, either single or double, must be known and the position of the last "1" in the result must be determined.

The sign bit in the result before normalization indicates if the number is positive or negative. If the sign bit is "1", the number is negative. If the sign bit is "0", then the number is positive. After this information is obtained, the result is shifted until a "1" is in the MSB position, if the number is positive. If the number is negative, it is shifted until a "0" is in the MSB. At this point, the result consists of a mantissa, a guard bit, a round bit, and a sticky. The value of knowing where the last "1" is, whether in the mantissa or sticky, is that it determines how to round the result based on defined I.E.E.E. rounding modes.

Figure 2:
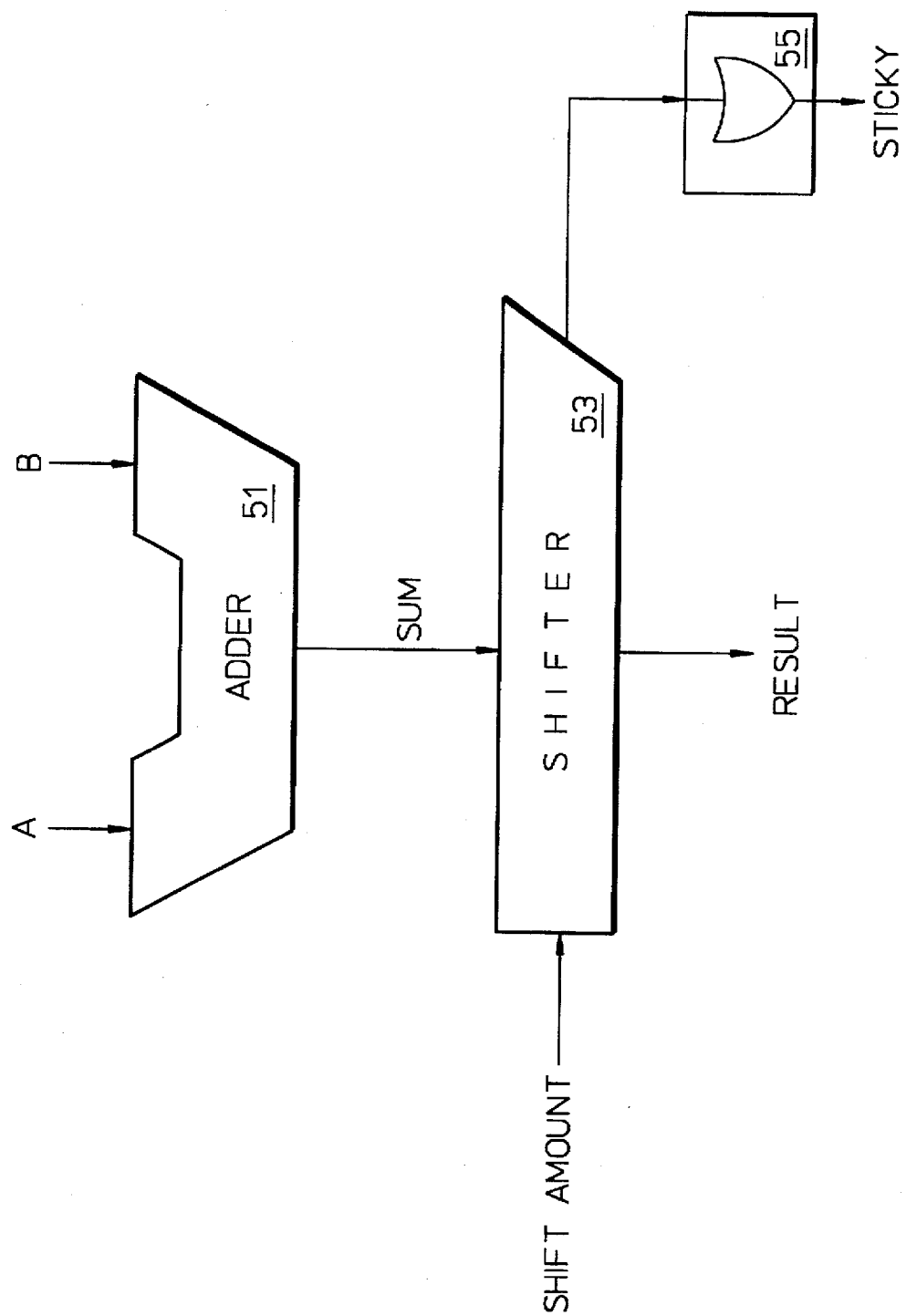
FIG. 2 is a block diagram of a known adder/shifter combination.

FIG. 2 illustrates a known system for determining the sticky after an addition is performed. Operands A and B are provided to adder 51. The result of the addition is placed in shifter 53. After determining whether the number is positive or negative and whether it is a double or single precision result, the result is shifted the necessary amount. The sticky is applied to a series of OR gates 55 to determine its value.

Figure 3:
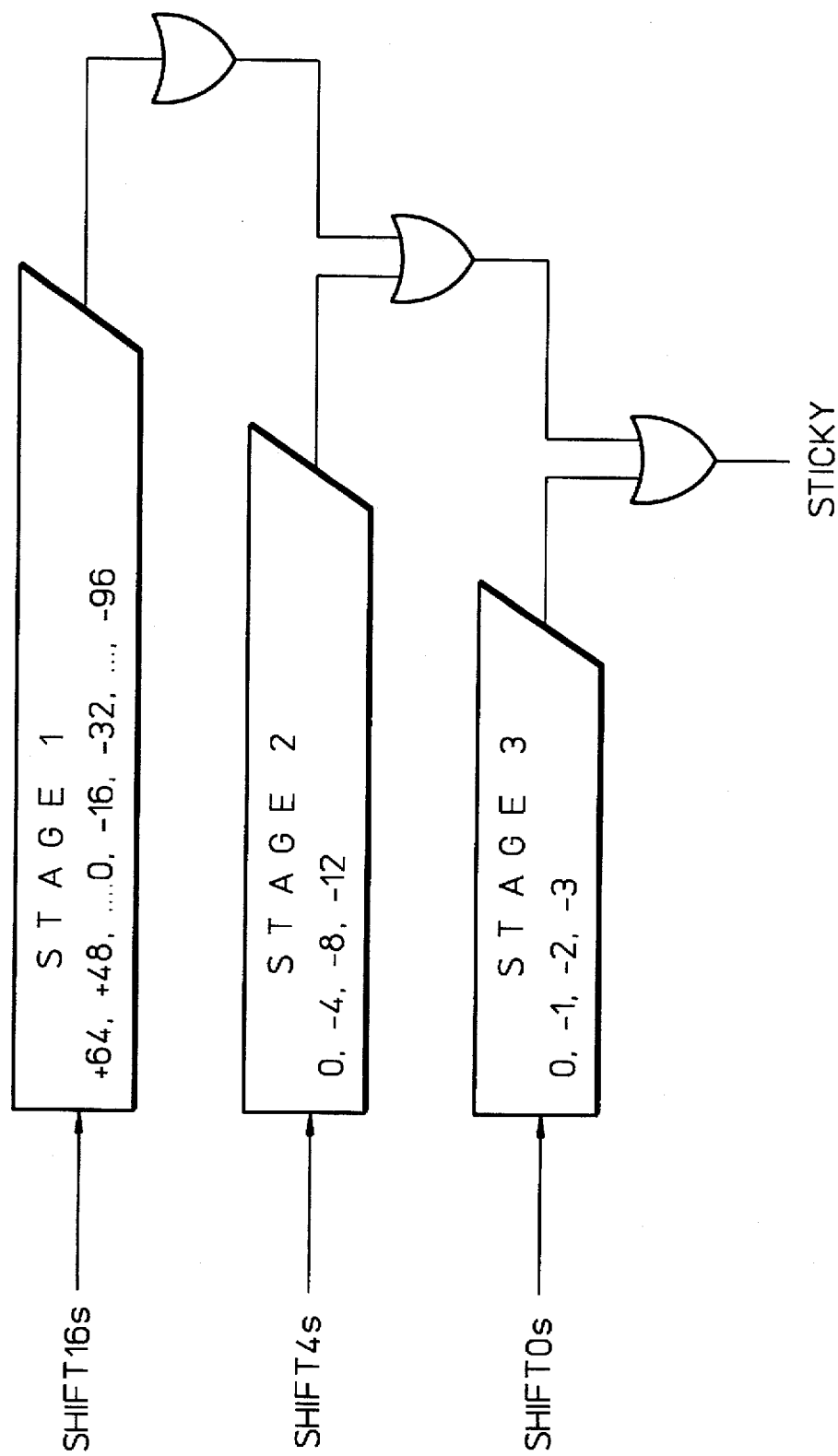
FIG. 3 is a block diagram of the multi-stage OR gates needed to generate the shift amount for the circuit of FIG. 2.

FIG. 3 provides additional detail of how OR gates 55 would be arranged in an actual system. In a worst case scenario, where the result of A+B is much smaller than a successive operand C, which will be added to the result, it is possible that the entire result of A+B must be shifted out. The delay imposed by so many successive, coupled OR gates is substantial.

Figure 4:
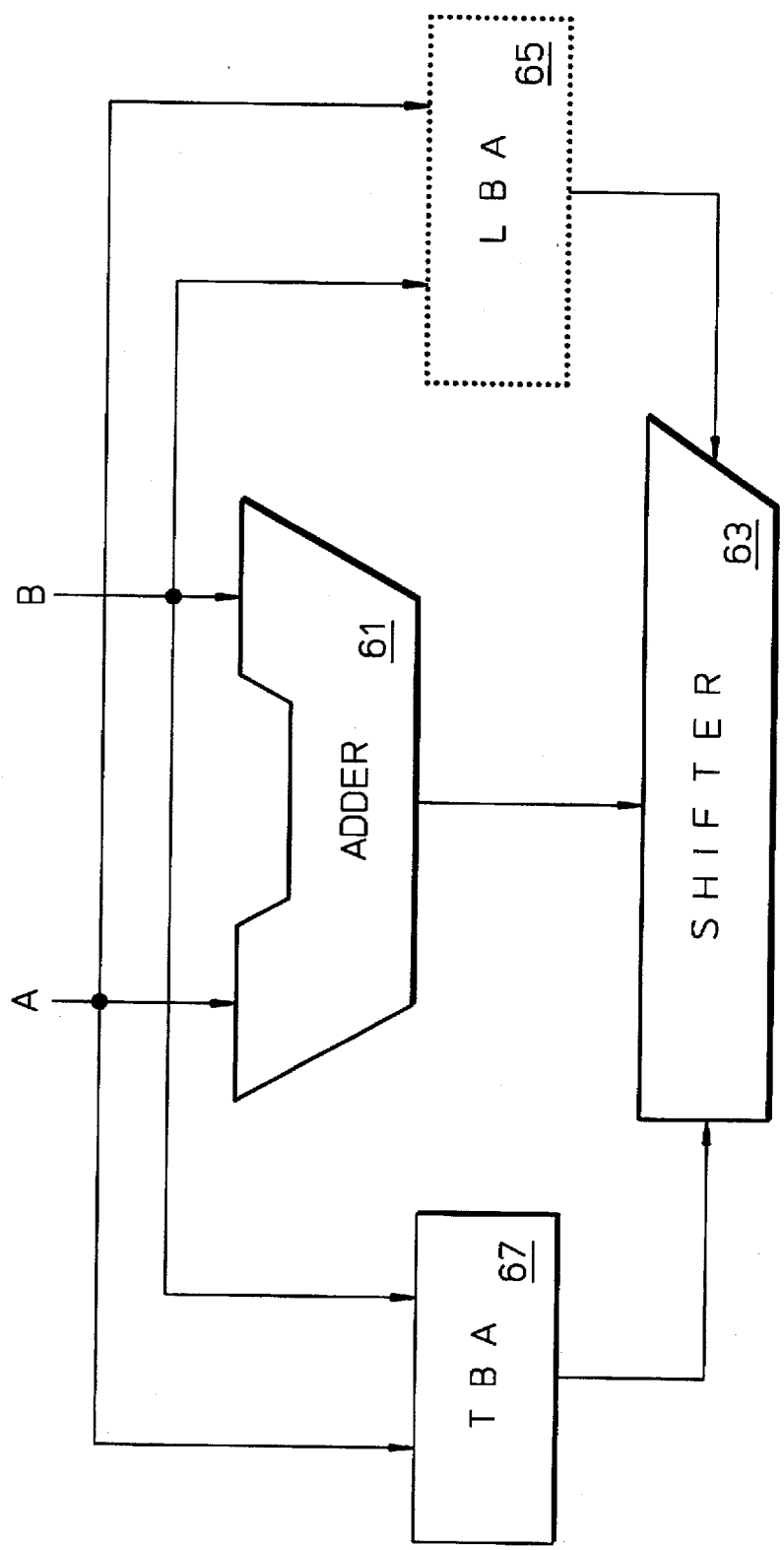
FIG. 4 is a block diagram of a first embodiment of the present invention.

A first embodiment of the present invention is shown in FIG. 4. It comprises adder 61, shifter 63, leading bit anticipator 65, and trailing bit anticipator 67. Adder 61 receives as input operands A and B and provides the result to shifter 63. Both adder 61 and shifter 63 are known in the art and their construction and operation would be obvious to one of ordinary skill in the art. Leading bit anticipator 65 generates the leading bit of the result prior to the completion of the addition operation within adder 61. Its design and operation, however, is not relevant to the discussion herein of trailing bit anticipator 67.

As shown in FIG. 4, operands A and B are provided to trailing bit anticipator 67 at the same time they are provided to adder 61. The two operands are encoded within trailing bit anticipator 67 for further processing. The two operands are fed simultaneously into a simple logic circuit within the anticipator that uses the values in the same bit position in both operands to generate a "K", "P" or "G". This type of encoding is known and a table of it is provided by FIG. 5. Thus, if bit position $A_N$ and $B_N$ are respectively "1" and "1", the encoded value is "G". If bit positions $A_N$ and $B_N$ are both "0", the resulting encoded value is K. Finally, if bit positions $A_N$ and $B_N$ have different values, the resulting encoded value is P.

Once the encoded word is obtained from the logic circuit, the binary sticky word can be derived from the encoded word. Using first the carry-in value and the least significant position of the encoded word, the combination yields a binary value according to the table shown in FIG. 6. For example, if the encoded bit is either K or G and the carry-in bit is "1", then the final binary sticky word bit is 1. For all other combinations of encoded bit values and carry-in values, the binary sticky word bit is 0.

After using the carry-in bit value and the least significant encoded bit value to generate the least significant bit value of the binary sticky word, the least significant encoded value and the next successive encoded value are combined and a binary sticky word bit is generated according to the table shown in FIG. 7. Thus, for example, if the two encoded values are respectively P and G, the resulting bit value in the binary sticky word would be 1. This continues until a final binary sticky word has been generated. The trailing "1" bit in the binary sticky word will be in the same position as the trailing "1" bit in the actual result of the addition.

FIG. 8 illustrates an example of how the present invention would process two operands A and B. For bit positions $A_0$ and $B_0$ through $A_8$ and $B_8$, the respective bit positions are encoded using the table shown in FIG. 5. For example, both $A_0$ and $B_0$ are "1". Their encoded value is therefore "G". The end result of this portion of the process is encoded word 71.

Next, the least significant encoded bit position is combined with the carry-in bit to generate the binary sticky word coding. In this case, the carry-in is "0" and the least significant encoded bit is "G". The resulting binary sticky word bit value is "0".

Finally, for N is 0 to 8, the encoded word positions N and N+1 are combined according to the table shown in FIG. 7. The resulting binary sticky word 73 has a least significant bit in the $N_1$, position. The actual result 77 of the addition has a LSB in that same position.

The 2 bit combinations that are needed to generate the binary sticky word all occur in parallel, so that there is only a one gate delay in generating the sticky binary word. The only information provided by the sticky word is the position of the LSB. With this third piece of information, however, the proper normalizing can be done.

In known systems, determining the LSB position or sticky would require waiting for the adder to add the two operands, another period of waiting until the MSB was shifted into the proper position, and a final waiting period while the bits of the result are ORed together to determine the sticky. In the present invention, there is no need to wait for either the completion of the addition or the shifting. Although in this first embodiment of the present invention a number of OR gates and OR gating is used to generate the final sticky, nothing herein requires such OR gates. Other embodiments of the present invention could scan the sticky word without using such gates.

What is claimed is:

1. A method for determining the position of the least significant bit in the result of the addition of a first and second operand in parallel with the addition of the first and second operand, the method comprising the steps of:
   forming a single encoded word from the first and second operand using a first predefined encoding table;
   converting the single encoded word into a binary sticky word using a second predefined encoding table; and
   determining the position of the least significant bit in the binary sticky word, the location of the least significant bit in the binary sticky word being the same as the location of the least significant bit of the addition.

2. The method of claim 1 wherein further the step of converting the single encoded word comprises a first step to convert a carry-in bit and the least significant bit of the single encoded word into a least significant bit of the binary sticky word, and a second step wherein each pair of bits of the encoded word, beginning with the least significant bit and its incremental neighbor, are converted into a binary bit in the binary sticky word.

3. In a digital computer having at least a first adding unit for adding a first and second operand, a trailing bit anticipator for determining the position of the least significant bit in the result of the addition occurring in the first adding unit before the first adding unit has completed the addition, the trailing bit anticipator comprising:
   first encoding means for receiving the first and second operands and encoding them together to form a first encoded word using a first predefined encoding format;
   second encoding means for receiving the first encoded word and a carry-in bit and forming a binary sticky word from the first encoded word and the carry-in bit using a second predefined encoding format; and
   trailing bit detector means for detecting the least significant bit in the binary sticky word.

* * * * *